(12) United States Patent
Yamaguchi et al.

(10) Patent No.: US 12,115,999 B2
(45) Date of Patent: Oct. 15, 2024

(54) METHOD FOR PREDICTING BEHAVIOR OF OTHER VEHICLE, DEVICE FOR PREDICTING BEHAVIOR OF OTHER VEHICLE, AND DRIVING ASSISTANCE METHOD

(71) Applicant: Nissan Motor Co., Ltd., Yokohama (JP)

(72) Inventors: Shotaro Yamaguchi, Kanagawa (JP); Takuya Nanri, Kanagawa (JP); Shinya Tanaka, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/283,640

(22) PCT Filed: Mar. 26, 2021

(86) PCT No.: PCT/IB2021/000235
§ 371 (c)(1),
(2) Date: Sep. 22, 2023

(87) PCT Pub. No.: WO2022/200826
PCT Pub. Date: Sep. 29, 2022

(65) Prior Publication Data
US 2024/0174240 A1 May 30, 2024

(51) Int. Cl.
*B60W 50/00* (2006.01)
*B60W 30/095* (2012.01)
*B60W 40/02* (2006.01)

(52) U.S. Cl.
CPC .... *B60W 50/0097* (2013.01); *B60W 30/0956* (2013.01); *B60W 40/02* (2013.01);
(Continued)

(58) Field of Classification Search
None
See application file for complete search history.

(56) References Cited

U.S. PATENT DOCUMENTS

2018/0218601 A1 8/2018 Aoki et al.
2019/0283751 A1 9/2019 Ueda et al.
(Continued)

FOREIGN PATENT DOCUMENTS

JP 2006-294065 A 10/2006
JP 2009-251759 A 10/2009
(Continued)

*Primary Examiner* — Anshul Sood
(74) *Attorney, Agent, or Firm* — Young Basile Hanlon & MacFarlane, P.C.

(57) ABSTRACT

An other-vehicle behavior prediction method includes calculating a travel path of the host vehicle, detecting a position of an intersection present on the travel path of the host vehicle and within a predetermined distance from the host vehicle, and detecting a position of another vehicle around the host vehicle before the intersection. A host-vehicle passing area through which the host vehicle passes when proceeding through the intersection and an other-vehicle passing area through which the first oncoming vehicle is predicted to pass when proceeding through the intersection are calculated, a space between the host-vehicle passing area and the another-vehicle passing area is calculated, and a distance between the first oncoming vehicle and the intersection is calculated. Based on the space and the distance, a probability that the first oncoming vehicle will proceed through the intersection ahead of the host vehicle is predicted.

12 Claims, 7 Drawing Sheets

(52) U.S. Cl.
CPC ............... *B60W 2554/4044* (2020.02); *B60W 2554/801* (2020.02)

(56) References Cited

U.S. PATENT DOCUMENTS

| | | | |
|---|---|---|---|
| 2020/0211394 A1* | 7/2020 | King | G05D 1/0289 |
| 2020/0385020 A1 | 12/2020 | Komuro | |
| 2021/0094547 A1* | 4/2021 | Garcia | B60W 30/181 |
| 2024/0043037 A1* | 2/2024 | Bagnell | B60W 60/0027 |

FOREIGN PATENT DOCUMENTS

| | | |
|---|---|---|
| JP | 2011-22884 A | 2/2011 |
| JP | 2019-160032 A | 9/2019 |
| JP | 2020-185968 A | 11/2020 |

* cited by examiner

METHOD FOR PREDICTING BEHAVIOR OF OTHER VEHICLE, DEVICE FOR PREDICTING BEHAVIOR OF OTHER VEHICLE, AND DRIVING ASSISTANCE METHOD

TECHNICAL FIELD

The invention relates to a method for predicting the behavior of another vehicle, a device for predicting the behavior of another vehicle, and a driving assistance method.

BACKGROUND

Japanese Unexamined Patent Application Publication No. 2009-251759 describes an intersection yielding assistance system in which, when it is determined that a vehicle on a non-priority road has stopped for a predetermined time or more before an intersection where the non-priority road and a priority road intersect, information indicating that the vehicle on the non-priority road has stopped is transmitted to a driver of a vehicle on the priority road. In this intersection yielding assistance system, when a vehicle on the non-priority road has stopped for the predetermined time or more, information requesting to stop before the intersection for the purpose of yielding is transmitted to a driver of a vehicle on the priority road.

SUMMARY

In the intersection yielding assistance system described in Japanese Unexamined Patent Application Publication No. 2009-251759, when a vehicle on the non-priority road has not stopped before the intersection for the predetermined time or more, information requesting to yield is not transmitted to a driver of a vehicle on the priority road. Thus, when the host vehicle turns right or left at the intersection, if an oncoming vehicle present on the road ahead of the right or left turn does not stop before the intersection and proceeds through the intersection, the vehicle is unable to make a decision to yield the right of way to the intersection to the oncoming vehicle. As a result, the vehicle and the oncoming vehicle approaching each other may cause discomfort to the driver.

The present invention provides a method for predicting the behavior of another vehicle, the method being capable of, when a host vehicle turns right or left at an intersection, predicting the probability that an oncoming vehicle present on the road ahead of the right or left turn will proceed through the intersection ahead of the host vehicle, and determining whether or not to yield the right of way to the intersection to the oncoming vehicle.

A behavior prediction method according to one aspect of the present invention calculates a travel path of a host vehicle, detects the position of an intersection present on the travel path of the host vehicle and within a predetermined distance from the host vehicle, and before the intersection, detects the position of another vehicle in the vicinity of the host vehicle. When there is a first oncoming vehicle on a road ahead of the travel path of the host vehicle turning right or left at the intersection, a host-vehicle passing area through which the host vehicle passes when proceeding through the intersection and an other-vehicle passing area through which the first oncoming vehicle is predicted to pass when proceeding through the intersection are calculated, a space between the host-vehicle passing area and the other-vehicle passing area is calculated, and a distance between the first oncoming vehicle and the intersection is calculated. Based on the space and the distance, a probability that the first oncoming vehicle will proceed through the intersection ahead of the host vehicle is predicted.

In the present invention, when a host vehicle turns right or left at an intersection, it is possible to predict the probability that an oncoming vehicle on the road ahead of the right or left turn will proceed through the intersection ahead of the host vehicle and to determine whether to yield the right of way to the intersection to the oncoming vehicle.

DETAILED DESCRIPTION

First Embodiment

The first embodiment to which the present invention is applied will be described below with reference to the drawings. In the description of the drawings, the same parts are denoted by the same reference signs, and the description thereof will be omitted.

[Configuration of a Driving Assistance Device]

Figure 1:
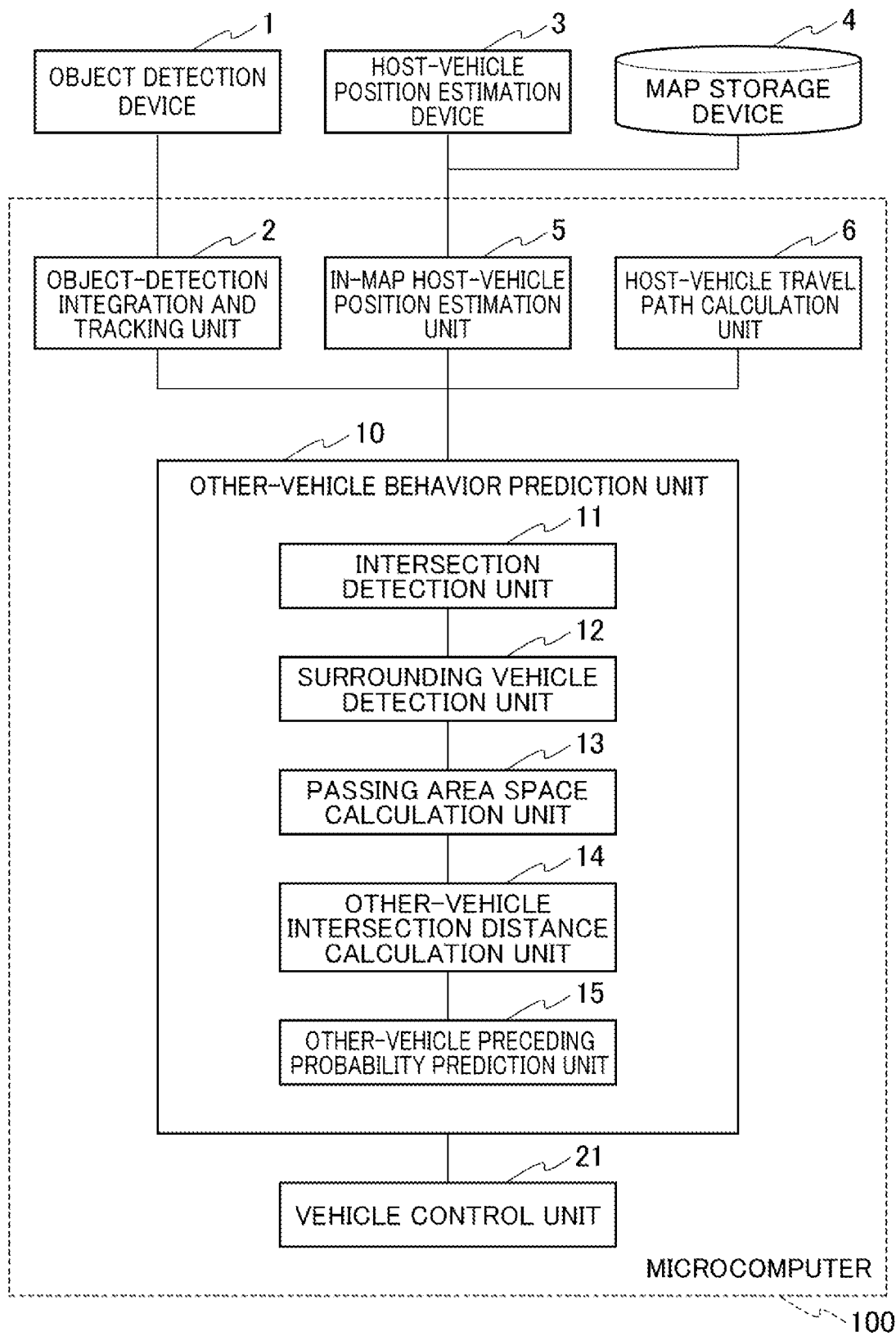
FIG. 1 is a functional block diagram of an other-vehicle behavior prediction device and a driving assistance device according to an embodiment of the present invention.

The configuration of a driving assistance device according to the present embodiment will be described with reference to FIG. 1. The driving assistance device includes an object detection device 1, a host-vehicle position estimation device 3, a map storage device 4, and a microcomputer 100.

The object detection device 1 includes multiple different kinds of object detection sensors that are mounted on a host vehicle 31 and detect objects in the vicinity of the vehicle 31, such as a laser radar, a millimeter wave radar, and a camera. The object detection device 1 detects objects in the vicinity of the host vehicle 31 using multiple object detection sensors. The object detection device 1 detects, relative to the host vehicle 31, the position, orientation, size, speed, and the like of other vehicles, motorcycles, bicycles, pedestrians, obstacles, and the like.

As a detection result, the object detection device 1 outputs, for example, the two-dimensional position, orientation, size, speed, and the like of an object in a zenith view (also called a plan view) viewed from the air above the host vehicle 31. Note that when the host vehicle 31 and other vehicles, motorcycles, and the like around the host vehicle include communication devices capable of communicating with each other, the object detection device 1 may obtain the position, orientation, size, speed, and the like of the other vehicles, motorcycles, and the like around the host vehicle by communicating with the other vehicles, motorcycles, and the like around the host vehicle (vehicle-to-vehicle communication).

The host-vehicle position estimation device 3 includes a position detection sensor that is mounted on the host vehicle 31 and measures the absolute position of the host vehicle 31, such as a global positioning system (GPS) or odometry sensor. The host-vehicle position estimation device 3 uses the position detection sensor to measure the absolute position of the host vehicle 31, that is, the position, orientation, and speed of the host vehicle 31 with respect to a predetermined reference point.

The map storage device 4 stores map information indicating the structure of a road on which the host vehicle 31 travels. The map storage device 4 may have a map database storing map information or obtain map information from an external map data server using cloud computing. The map information stored by the map storage device 4 includes information on road structures, such as the absolute position of a road and lanes on the road, connection relationships between lanes, and relative position relationships. Note that here, a road means a travel area for a vehicle including a single lane or multiple lanes having a common travel direction, and a lane means a travel area divided using lane markers on a road.

The microcomputer 100 (an example of a control unit) calculates a travel path for the host vehicle 31 and assists travel of the host vehicle 31 along the calculated travel path. The microcomputer 100 detects the position of another vehicle in the vicinity of the host vehicle 31, predicts the behavior of a first oncoming vehicle 32 when the first oncoming vehicle 32 is present on a road ahead of the travel path of the host vehicle 31 turning right or left at an intersection, and controls travel of the host vehicle 31 based on the result of predicting the behavior of the first oncoming vehicle 32.

Note that in the embodiment, the microcomputer 100 is described as an example of the driving assistance device that controls the host vehicle 31. However, the present invention is not limited to this. For example, the microcomputer 100 can be implemented as an other-vehicle behavior prediction device that predicts the behavior of the first oncoming vehicle 32. That is, the microcomputer 100 may not calculate a travel path for the host vehicle 31 and control travel of the host vehicle 31 along the travel path, and may finally output a prediction result of the behavior of the first oncoming vehicle 32.

The microcomputer 100 is a general-purpose microcomputer including a CPU (central processing unit), a memory, and an input/output unit. The microcomputer 100 has a computer program (driving assistance program) installed thereon to make it function as a driving assistance device. By executing the computer program, the microcomputer 100 functions as multiple information processing circuits (2, 5, 6, 10, and 21) provided in the driving assistance device. Note that here, an example of realizing the multiple information processing circuits (2, 5, 6, 10, and 21) provided in the driving assistance device using software is illustrated, but of course it is also possible to configure the information processing circuits (2, 5, 6, 10, and 21) by preparing dedicated hardware for executing each information processing illustrated below. In addition, the multiple information processing circuits (2, 5, 6, 10, and 21) may be configured by individual hardware. Furthermore, the information processing circuits (2, 5, 6, 10, and 21) may also serve as an electronic control unit (ECU) used for other control related to the vehicle.

The microcomputer 100 includes, as multiple information processing circuits (2, 5, 6, 10, and 21), an object-detection integration and tracking unit 2, an in-map host-vehicle position estimation unit 5, a host-vehicle travel path calculation unit 6, an other-vehicle behavior prediction unit 10, and a vehicle control unit 21. Furthermore, the other-vehicle behavior prediction unit 10 includes an intersection detection unit 11, a surrounding vehicle detection unit 12, a passing area space calculation unit 13, an other-vehicle intersection distance calculation unit 14, and an other-vehicle preceding probability prediction unit 15. Note that an information processing circuit (vehicle control unit 21) is not required when the other-vehicle behavior prediction device to predict the behavior of the first oncoming vehicle 32 is implemented.

The object-detection integration and tracking unit 2 integrates multiple detection results obtained from each of the multiple object detection sensors provided in the object detection device 1 and outputs one detection result for each object. Specifically, from the position, orientation, size, and speed of an object obtained from each of the object detection sensors, the most reasonable position, orientation, size, and speed of the object having the least error are calculated in consideration of the error characteristics of each object detection sensor. Specifically, by using known sensor fusion techniques, detection results obtained by multiple types of sensors are comprehensively evaluated to obtain more accurate detection results.

The object-detection integration and tracking unit 2 tracks an object detected by the object detection device 1. Specifically, verification of the identity (correspondence) of an object between different times is performed based on the position, orientation, size, speed, and the like of the object outputted at different times, and the speed information of the object is estimated based on the correspondence. Note that the position, orientation, size, speed, and the like of an object outputted at different times are stored in a memory in the microcomputer 100 and are used for detection of other vehicles and calculation of an other-vehicle travel path 51 described below. Note that when the host vehicle 31 and vehicles such as other vehicles and motorcycles around the host vehicle are capable of performing communication (vehicle-to-vehicle communication), the unique ID of each vehicle can be received from the other vehicles and motorcycles around the host vehicle, and the identity of an object can be verified based on received IDs.

From the absolute position and orientation of the host vehicle 31 obtained by the host-vehicle position estimation device 3 and the map data stored in the map storage device 4, the in-map host-vehicle position estimation unit 5 estimates the position and orientation of the host vehicle 31 on the map. Then, the in-map host-vehicle position estimation unit 5 identifies a road on which the host vehicle 31 has travelled. The in-map host-vehicle position estimation unit 5 may further identify a lane on which the host vehicle 31 has travelled.

From the position of the host vehicle 31 on the map obtained by the in-map host-vehicle position estimation unit 5, the host-vehicle travel path calculation unit 6 calculates a travel path (host-vehicle travel path 41) for each road unit on which the host vehicle 31 is to travel to the destination of the host vehicle 31 on the map. Note that the host-vehicle travel path calculation unit 6 may calculate a travel path for each lane unit on which the host vehicle 31 is to travel.

The other-vehicle behavior prediction unit 10 detects the position of an intersection present on the host-vehicle travel path 41 and within a predetermined distance from the host vehicle 31, detects, before the intersection, the position of another vehicle in the vicinity of the host vehicle 31, and predicts the probability that the first oncoming vehicle 32 will go through the intersection ahead of the host vehicle 31 when the first oncoming vehicle 32 is on the road ahead of the host-vehicle travel path 41 turning right or left at the intersection. The other-vehicle behavior prediction unit 10 includes an intersection detection unit 11, a surrounding vehicle detection unit 12, a passing area space calculation unit 13, an other-vehicle intersection distance calculation unit 14, and an other-vehicle preceding probability prediction unit 15. The specific configuration of the other-vehicle behavior prediction unit 10 will be described below.

Based on the information about the host-vehicle travel path 41 obtained by the host-vehicle travel path calculation unit 6, the intersection detection unit 11 detects the position of an intersection present on the host-vehicle travel path 41 and within a predetermined distance from the current position of the host vehicle 31 on the travel path of the host vehicle. The intersection detection unit 11 determines whether the host-vehicle travel path 41 turns right or left at the intersection.

Before the intersection detected by the intersection detection unit 11, the surrounding vehicle detection unit 12 detects the position of another vehicle in the vicinity of the host vehicle 31. Specifically, when the host-vehicle travel path 41 turns right or left at the intersection detected by the intersection detection unit 11, the surrounding vehicle detection unit 12 obtains, before the intersection, information on a detection result obtained from the object-detection integration and tracking unit 2. From the position, orientation, size, and speed of the obtained object, it is determined whether or not the object is another vehicle. The surrounding vehicle detection unit 12 identifies the position of the other vehicle on the map from the position of the other vehicle present in the vicinity of the host vehicle 31 and the position of the host vehicle 31 on the map. The surrounding vehicle detection unit 12 then determines whether or not a first oncoming vehicle 32 is present on the road ahead of the host-vehicle travel path 41 turning right or left at the intersection.

When a first oncoming vehicle 32 is present on the road ahead of the host-vehicle travel path 41 turning right or left at the intersection, the passing area space calculation unit 13 predicts the intended movement of the first oncoming vehicle 32 based on the position, orientation, and speed of the first oncoming vehicle 32 and the road structure, and calculates a travel path (other-vehicle travel path 51) of the first oncoming vehicle 32 at the intersection. Then, a host-vehicle passing area 42 through which the host vehicle 31 passes when proceeding through the intersection and an other-vehicle passing area 52 through which the first oncoming vehicle 32 is predicted to pass when proceeding through the intersection are calculated, and the space between the host-vehicle passing area 42 and the other-vehicle passing area 52 is calculated.

Specifically, based on the road structure at the intersection on the map, the host-vehicle travel path 41, and the vehicle width of the host vehicle 31, the passing area space calculation unit 13 calculates the host-vehicle passing area 42, which is the area that the host vehicle 31 passes through when the host vehicle 31 travels along the host-vehicle travel path 41 turning right or left at the intersection. Furthermore, based on the road structure at the intersection on the map, the other-vehicle travel path 51, and the size (vehicle width) of the first oncoming vehicle 32, the passing area space calculation unit 13 calculates the other-vehicle passing area 52, which is the area through which the first oncoming vehicle 32 is predicted to pass when traveling along the other-vehicle travel path 51 at the intersection. Then, the passing area space calculation unit 13 calculates the narrowest space between the host-vehicle passing area 42 and the other-vehicle passing area 52 as a space 61 between the host-vehicle passing area 42 and the other-vehicle passing area 52.

When the first oncoming vehicle 32 is present on the road ahead of the host-vehicle travel path 41 turning right or left at the intersection, the other-vehicle intersection distance calculation unit 14 calculates a distance 71 between the first oncoming vehicle 32 and the intersection. Based on the position of the first oncoming vehicle 32 on the map and the road structure at the intersection on the map, the other-vehicle intersection distance calculation unit 14 calculates the distance 71 between the first oncoming vehicle 32 and the intersection. For example, based on the distance between the first oncoming vehicle 32 and the center of the intersection, the other-vehicle intersection distance calculation unit 14 calculates the distance 71 between the first oncoming vehicle 32 and the intersection. For example, the other-vehicle intersection distance calculation unit 14 may detect the position of a stop line before the intersection, and may calculate the distance 71 between the first oncoming vehicle 32 and the intersection based on the distance between the first oncoming vehicle 32 and the stop line. In this case, the other-vehicle intersection distance calculation unit 14 may calculate the distance 71 between the first oncoming vehicle 32 and the intersection by subtracting the distance between the first oncoming vehicle 32 and the stop line from the distance between the stop line and the center of the intersection. Note that instead of the stop line before the intersection, the position of a crosswalk before the intersection or the position of a curb at the entrance of the intersection may be detected, and there is no particular limitation on the method for calculating the distance 71 between the first oncoming vehicle 32 and the intersection.

The other-vehicle preceding probability prediction unit 15 predicts, based on the space 61 between the host-vehicle passing area 42 and the other-vehicle passing area 52 and the distance 71 between the first oncoming vehicle 32 and the intersection, the probability that the first oncoming vehicle 32 will proceed through the intersection ahead of the host vehicle 31. The other-vehicle preceding probability prediction unit 15 predicts that the probability of the first oncoming vehicle 32 proceeding through the intersection ahead of the host vehicle 31 is higher than the probability of the host vehicle 31 proceeding through the intersection ahead of the first oncoming vehicle 32, when the space 61 is less than a predetermined value of a preset space and the distance 71 is less than a predetermined value of a preset distance. An example of the other-vehicle behavior prediction method using the other-vehicle preceding probability prediction unit 15 will be described below with reference to FIGS. 2A to 2B and FIGS. 3A to 3B.

[Other-Vehicle Behavior Prediction Method]

Figure 2A:
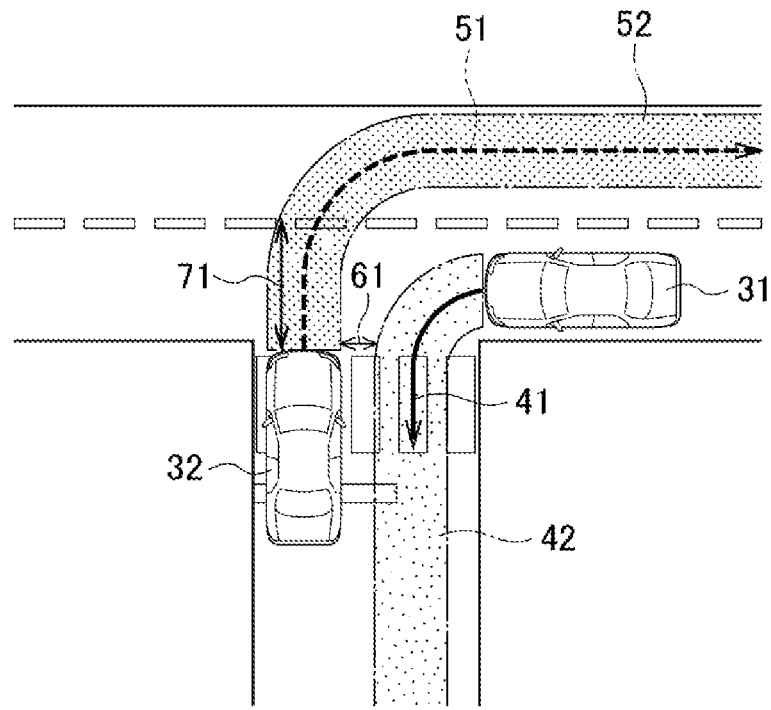
FIG. 2A is a diagram illustrating an example of a scene to which an other-vehicle behavior prediction method according to the embodiment of the present invention is applied.
Figure 2B:
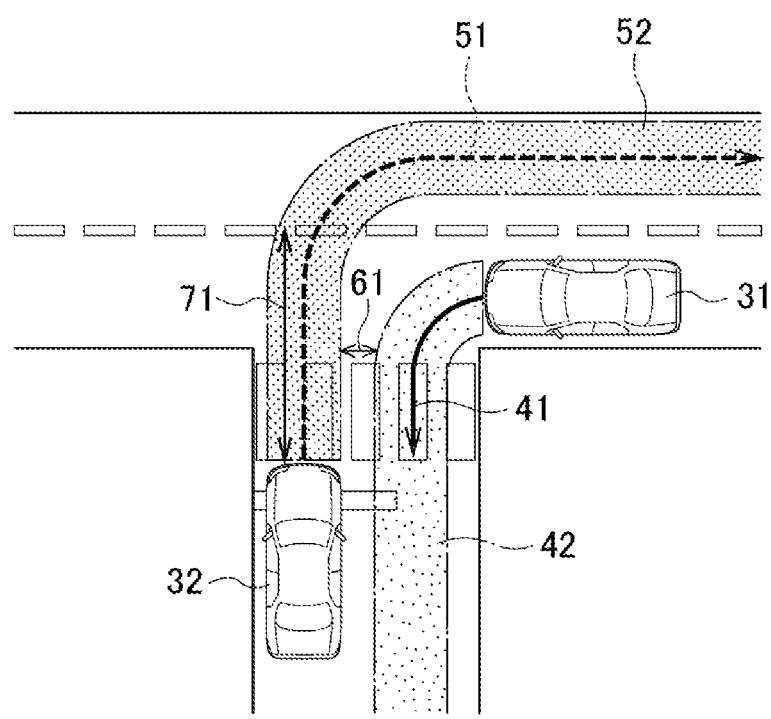
FIG. 2B is a diagram illustrating an example of a scene to which the other-vehicle behavior prediction method according to the embodiment of the present invention is applied.

In FIGS. 2A and 2B, the host-vehicle travel path 41 turns left, and the first oncoming vehicle 32 is present on the road ahead of the host-vehicle travel path 41 of the host vehicle 31 turning left at the intersection. In FIG. 2A, the space 61 between the host-vehicle passing area 42 and the other-vehicle passing area 52 is narrow, and the first oncoming vehicle 32 is present at a position near the intersection. Thus, when the host vehicle 31 continues proceeding through the intersection, there is a risk that the first oncoming vehicle 32 will proceed through the intersection ahead of the host vehicle 31 or at the same time as the host vehicle 31 and the host vehicle 31 and the first oncoming vehicle 32 will approach each other.

Meanwhile, in FIG. 2B, the space 61 between the host-vehicle passing area 42 and the other-vehicle passing area 52 is narrow as in FIG. 2A. However, the first oncoming vehicle 32 is present at a position further from the intersection than in FIG. 2A. Thus, even when the host vehicle 31 proceeds through the intersection as it is, it is predicted that the first oncoming vehicle 32 will proceed through the intersection later than the host vehicle 31, and it is unlikely that the host vehicle 31 will approach the first oncoming vehicle 32.

Thus, the other-vehicle preceding probability prediction unit 15 predicts that the probability of the first oncoming vehicle 32 proceeding through the intersection ahead of the host vehicle 31 is high when both of the following conditions are satisfied: the condition that the space 61 between the host-vehicle passing area 42 and the other-vehicle passing area 52 is less than a predetermined value of a predetermined space (hereinafter referred to as condition 1), and the condition that the distance 71 between the first oncoming vehicle 32 and the intersection is less than a predetermined value of a predetermined distance (hereinafter referred to as condition 2). When at least one of condition 1 or condition 2 is not satisfied, the probability of the first oncoming vehicle 32 proceeding through the intersection ahead of the host vehicle 31 is predicted to be low.

For example, in FIG. 2A, the other-vehicle preceding probability prediction unit 15 determines that the space 61 between the host-vehicle passing area 42 and the other-vehicle passing area 52 is less than a predetermined value of a preset space and that the distance 71 between the first oncoming vehicle 32 and the intersection is less than a predetermined value of a preset distance. In this case, both conditions 1 and 2 are satisfied, and thus the other-vehicle preceding probability prediction unit 15 predicts that the probability of the first oncoming vehicle 32 proceeding through the intersection ahead of the host vehicle 31 is high.

In contrast, in FIG. 2B, the other-vehicle preceding probability prediction unit 15 determines that the space 61 between the host-vehicle passing area 42 and the other-vehicle passing area 52 is less than the predetermined value of the preset space and that the distance 71 between the first oncoming vehicle 32 and the intersection is greater than or equal to the predetermined value of the preset distance. In this case, the other-vehicle preceding probability prediction unit 15 predicts that the probability of the first oncoming vehicle 32 proceeding through the intersection ahead of the host vehicle 31 is low since condition 1 is satisfied but condition 2 is not satisfied.

Figure 3A:
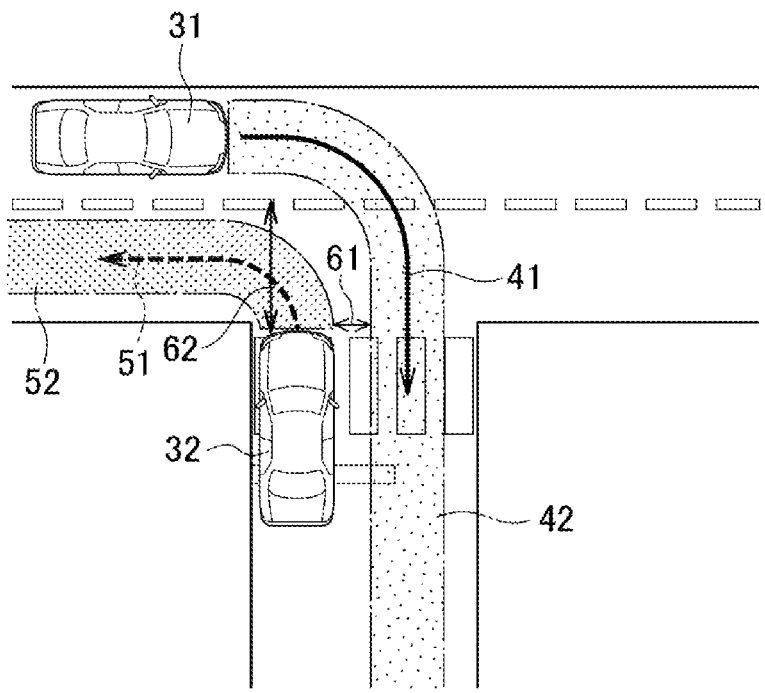
FIG. 3A is a diagram illustrating an example of a scene to which the other-vehicle behavior prediction method according to the embodiment of the present invention is applied.
Figure 3B:
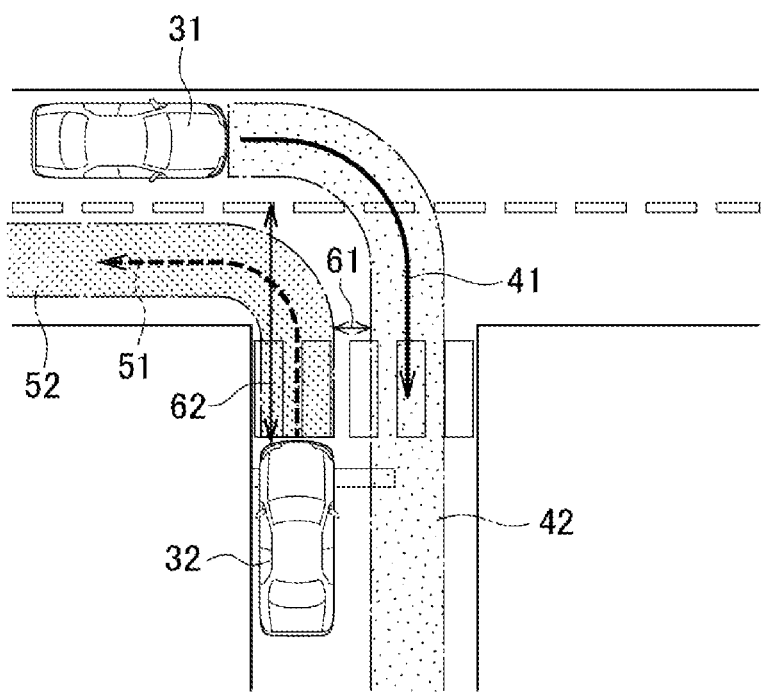
FIG. 3B is a diagram illustrating an example of a scene to which the other-vehicle behavior prediction method according to the embodiment of the present invention is applied.

Also, in FIGS. 3A and 3B, the host-vehicle travel path 41 of the host vehicle 31 turns right at the intersection, and the first oncoming vehicle 32 is present on the road ahead of the right turn. In FIG. 3A, the other-vehicle preceding probability prediction unit 15 determines that conditions 1 and 2 are satisfied, as in FIG. 2A. Then, the probability of the first oncoming vehicle 32 proceeding through the intersection ahead of the host vehicle 31 is predicted to be high.

In contrast, in FIG. 3B, the other-vehicle preceding probability prediction unit 15 determines that condition 1 is satisfied but condition 2 is not satisfied, as in FIG. 2B. Then, the probability that the first oncoming vehicle 32 will proceed through the intersection ahead of the host vehicle 31 is predicted to be low.

The vehicle control unit 21 controls the travel of the host vehicle 31 based on the result of the probability predicted by the other-vehicle behavior prediction unit 10 that the first oncoming vehicle 32 will proceed through the intersection ahead of the host vehicle 31. When the other-vehicle preceding probability prediction unit 15 predicts that the probability of the first oncoming vehicle 32 proceeding through the intersection ahead of the host vehicle 31 is higher than the probability of the host vehicle 31 proceeding through the intersection ahead of the first oncoming vehicle 32, the vehicle control unit 21 controls an actuator of the host vehicle 31 in such a manner that the vehicle stops before the intersection and yields the right of way to the intersection to the first oncoming vehicle 32. When the other-vehicle preceding probability prediction unit 15 predicts that the probability of the first oncoming vehicle 32 proceeding through the intersection ahead of the host vehicle 31 is lower than the probability of the host vehicle 31 proceeding through the intersection ahead of the first oncoming vehicle 32, the vehicle control unit 21 controls an actuator of the host vehicle in such a manner that the vehicle 31 proceeds through the intersection without yielding the right of way to the intersection to the first oncoming vehicle 32.

Figure 5:
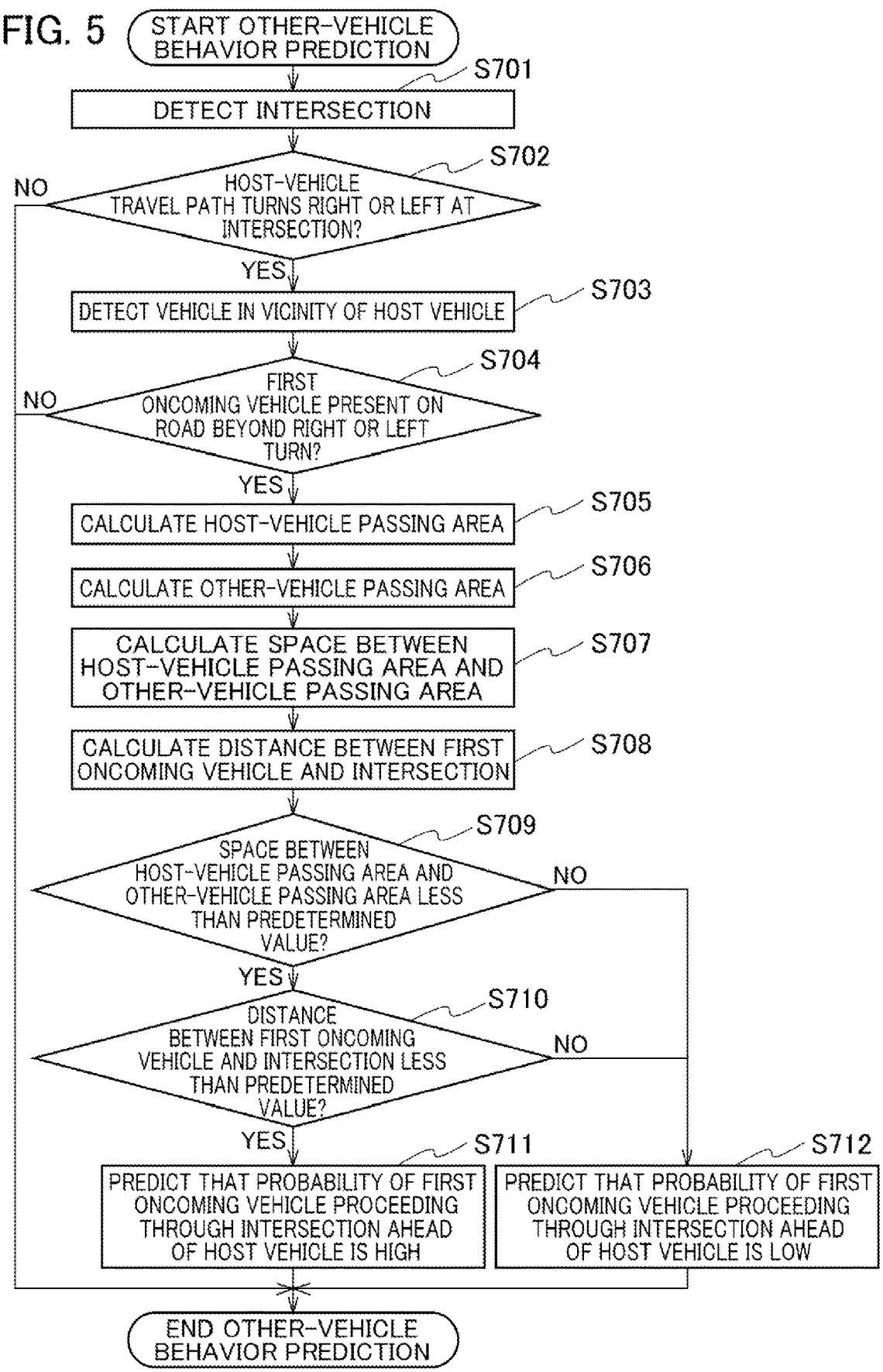
FIG. 5 is a flowchart illustrating an example of the detailed procedure of step S07 in FIG. 4.

When the other-vehicle behavior prediction unit 10 ends the processing in FIG. 5 in the middle, such as when the host-vehicle travel path 41 does not turn right or left at the intersection or when the first oncoming vehicle 32 is not present on the road ahead of the host-vehicle travel path 41 turning right or left, the vehicle control unit 21 controls an actuator of the host vehicle in such a manner that the vehicle 31 proceeds through the intersection as it is along the host-vehicle travel path 41. Note that the actuator includes a brake actuator, an accelerator actuator, and a steering actuator.

[Procedure for Driving Assistance Processing]

Next, an example of the procedure for driving assistance processing using a driving assistance device according to the present embodiment will be described with reference to the flowcharts in FIGS. 4 and 5. Note that by using the microcomputer 100 in FIG. 1 as the other-vehicle behavior prediction device for predicting the operation of the first oncoming vehicle 32, implementation as other-vehicle behavior prediction processing for finally outputting the result of processing operation illustrated in step S07 in FIG. 4 is possible.

Figure 4:
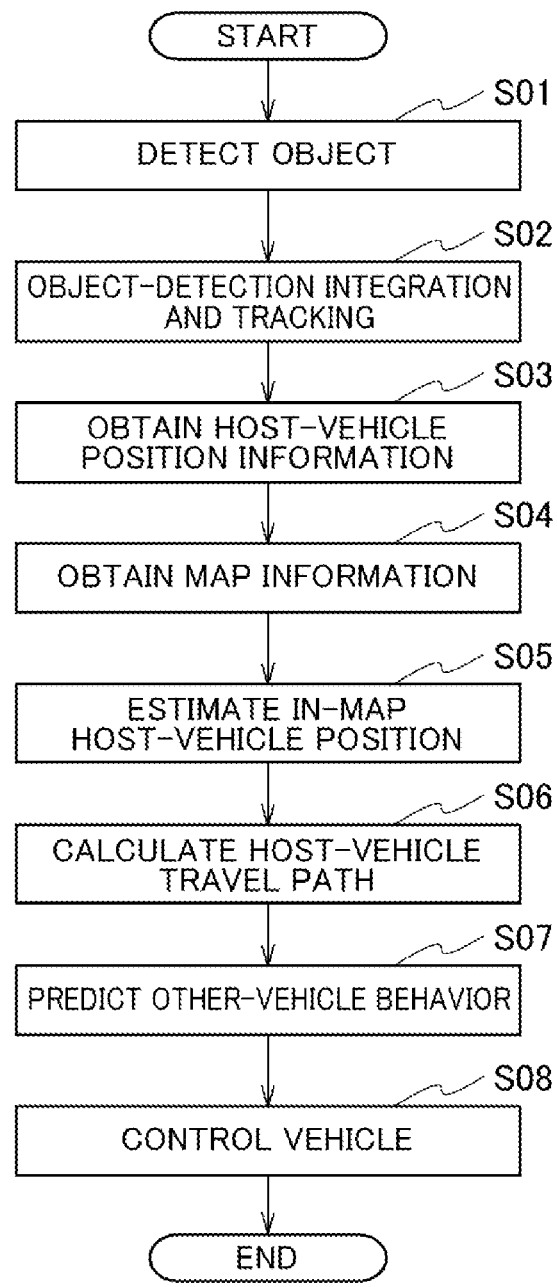
FIG. 4 is a flowchart illustrating an example of the operation of the other-vehicle behavior prediction device and the driving assistance device according to the embodiment of the present invention.

First, in step S01 in FIG. 4, the object detection device 1 detects the behavior of objects in the vicinity of the host vehicle 31 using multiple object detection sensors. Then, in step S02, the object-detection integration and tracking unit 2 integrates multiple detection results obtained from each of the multiple object detection sensors and outputs one detection result for each object. Then, each detected and integrated object is tracked.

In step S03, the host-vehicle position estimation device 3 measures the position, orientation, and speed of the host vehicle 31 with respect to a predetermined reference point using the position detection sensor. In step S04, the map storage device 4 obtains map information indicating the structure of the road on which the host vehicle 31 travels.

In step S05, the in-map host-vehicle position estimation unit 5 estimates the position and orientation of the host vehicle 31 on the map from the position of the host vehicle 31 measured in step S03 and the map data obtained in step S04.

In step S06, based on the position of the host vehicle 31 on the map obtained by the in-map host-vehicle position estimation unit 5, the host-vehicle travel path calculation unit 6 calculates for each road unit a travel path (host-vehicle travel path 41) on which the host vehicle 31 travels to the destination of the host vehicle 31.

In step S07, the other-vehicle behavior prediction unit 10 detects the position of an intersection present on the host-vehicle travel path 41 and within a predetermined distance from the host vehicle 31, detects, before the intersection, the position of another vehicle in the vicinity of the host vehicle 31, and predicts the probability that the first oncoming vehicle 32 will proceed through the intersection ahead of the host vehicle 31 when the first oncoming vehicle 32 is on the road ahead of the host-vehicle travel path 41 turning right or left at the intersection. The details of step S07 will be described with reference to FIG. 5.

First, in step S701, based on the information about the host-vehicle travel path 41 obtained by the host-vehicle travel path calculation unit 6, the intersection detection unit 11 detects the position of an intersection present on the host-vehicle travel path 41 and within a predetermined distance from the current position of the host vehicle 31. The intersection detection unit 11 determines whether the host-vehicle travel path 41 turns right or left at the intersection. When the host-vehicle travel path 41 turns right or left at the intersection (YES in step S702), the processing proceeds to step S703. In contrast, when the host-vehicle travel path 41 does not turn right or left at the intersection (NO in step S702), the other-vehicle behavior prediction unit 10 ends the processing in FIG. 5. This ends step S07 in FIG. 4.

In step S703, the surrounding vehicle detection unit 12 detects, before the intersection detected by the intersection detection unit 11, the position of another vehicle in the vicinity of the host vehicle. The processing proceeds to step S704, and the surrounding vehicle detection unit 12 determines whether or not the first oncoming vehicle 32 is present on the road ahead of the vehicle travel path 41 turning right or left at the intersection. When the first oncoming vehicle 32 is present on the road beyond the right or left turn at the intersection (YES in step S704), the processing proceeds to step S705. In contrast, when the first oncoming vehicle 32 is not present on the road ahead of the right or left turn at the intersection (NO in step S704), the other-vehicle behavior prediction unit 10 ends the process in FIG. 5. This ends step S07 in FIG. 4.

In step S705, the passing area space calculation unit 13 predicts the intended movement of the first oncoming vehicle 32 based on the position, orientation, and speed of the first oncoming vehicle 32 and the road structure, and calculates the other-vehicle travel path 51 at the intersection. The passing area space calculation unit 13 calculates the host-vehicle passing area 42 based on the road structure at the intersection on the map, the host-vehicle travel path 41, and the vehicle width of the host vehicle 31. Processing proceeds to step S706, and the passing area space calculation unit 13 calculates the other-vehicle travel path 52 based on the road structure at the intersection on the map, the other-vehicle travel path 51, and the size (vehicle width) of the first oncoming vehicle 32. The processing proceeds to step S707, and the passing area space calculation unit 13 calculates the space 61 between the host-vehicle passing area 42 and the other-vehicle passing area 52.

Processing proceeds to step S708, and the other-vehicle intersection distance calculation unit 14 calculates the distance 71 between the first oncoming vehicle 32 and the intersection based on the position of the first oncoming vehicle 32 on the map and the road structure at the intersection on the map.

Processing proceeds to step S709, and the other-vehicle preceding probability prediction unit 15 determines whether or not the space 61 between the host-vehicle passing area 42 and the other-vehicle passing area 52 is less than a predetermined value for a preset space. When the space 61 between the host-vehicle passing area 42 and the other-vehicle passing area 52 is less than the predetermined value of the preset space (YES in step S709), the processing proceeds to step S710. In contrast, when the space 61 between the host-vehicle passing area 42 and the other-vehicle passing area 52 is greater than or equal to the predetermined value of the preset space (NO in step S709), the processing proceeds to step S712.

In step S710, the other-vehicle preceding probability prediction unit 15 determines whether or not the distance 71 between the intersection and the first oncoming vehicle 32 is less than a predetermined value of a preset distance. When the distance 71 between the intersection and the first oncoming vehicle 32 is less than the predetermined value of the preset distance (YES in step S710), the processing proceeds to step S711. In contrast, when the distance 71 between the intersection and the first oncoming vehicle 32 is greater than or equal to the predetermined value of the preset distance (NO in step S710), the processing proceeds to step S711.

In step S711, the other-vehicle preceding probability prediction unit 15 predicts that the probability of the first oncoming vehicle 32 proceeding through the intersection ahead of the host vehicle 31 is higher than the probability of the host vehicle 31 proceeding through the intersection ahead of the first oncoming vehicle 32, and the process in FIG. 5 ends. In step S712, the other-vehicle preceding probability prediction unit 15 predicts that the probability of the first oncoming vehicle 32 proceeding through the intersection ahead of the host vehicle 31 is lower than the probability of the host vehicle 31 proceeding through the intersection ahead of the first oncoming vehicle 32, and the process in FIG. 5 ends. This ends step S07 in FIG. 4.

Processing proceeds to step S08 in FIG. 4, the vehicle control unit 21 controls the travel of the host vehicle 31 based on the result of the other-vehicle behavior prediction unit 10 having predicted the probability of the first oncoming vehicle 32 proceeding through the intersection ahead of the host vehicle 31. In addition, when the other-vehicle behavior prediction unit 10 ends the processing in FIG. 5 in the middle, such as when the host-vehicle travel path 41 does not turn right or left at the intersection, or when the first oncoming vehicle 32 is not present on the road ahead of the host-vehicle travel path 41 turning right or left, the vehicle control unit 21 controls the actuator of the host vehicle 31 in such a manner that the vehicle proceeds through the intersection along the host-vehicle travel path 41.

Note that the passing area space calculation unit 13 may calculate all the other-vehicle travel paths and other-vehicle passing areas where the first oncoming vehicle 32 may travel, such as when the first oncoming vehicle 32 turns right, turns left, or goes straight at the intersection, based on the position, orientation, and speed of the first oncoming vehicle 32 and the road structure, and may calculate each space between the host-vehicle passing area 42 and the multiple other-vehicle passing areas. In this case, the other-vehicle preceding probability prediction unit 15 may determine whether or not any of the spaces between the host-vehicle passing area 42 and the multiple other-vehicle passing areas is less than a predetermined value for a preset space.

Effects of the First Embodiment

As described above, according to the present embodiment, the following effects can be obtained.

The other-vehicle behavior prediction method according to the present embodiment calculates a travel path of the host vehicle, detects the position of an intersection present on the travel path of the host vehicle and within a predetermined distance from the host vehicle, and before the intersection, detects the position of another vehicle in the vicinity of the host vehicle. When a first oncoming vehicle is present on the road ahead of the travel path of the host vehicle turning right or left at the intersection, a host-vehicle passing area through which the host vehicle passes when proceeding through the intersection and an other-vehicle passing area through which the other vehicle is predicted to pass when proceeding through the intersection are calculated, the space between the host-vehicle passing area and the other-vehicle passing area is calculated, and the distance between the first oncoming vehicle and the intersection is calculated. Then, based on the space and distance, the probability that the first oncoming vehicle will proceed through the intersection ahead of the host vehicle is predicted.

With this, when the host vehicle turns right or left at the intersection, it is possible to predict, based on the space between the host-vehicle passing area and the other-vehicle passing area and the distance between the oncoming vehicle and the intersection on the road ahead of the right or left turn, the probability that the oncoming vehicle will proceed through the intersection ahead of the host vehicle, to determine whether or not the host vehicle is to yield the right of way to the intersection to the oncoming vehicle, and to implement driving assistance for the host vehicle. As a result, it is possible to prevent the driver of the host vehicle from feeling uncomfortable due to the host vehicle and the oncoming vehicle approaching each other when turning right or left at the intersection. In addition, due to the host vehicle yielding the right of way to the intersection to the oncoming vehicle, it is possible to reduce the time required for the oncoming vehicle to pass through the intersection. When the host vehicle does not have to yield the right of way to the intersection to the oncoming vehicle, the host vehicle can smoothly proceed through the intersection and reduce the time required for the host vehicle to pass through the intersection.

When the space between the host-vehicle passing area and the other-vehicle passing area is less than the predetermined value of the preset space and the distance between the first oncoming vehicle and the intersection is less than the predetermined value of the preset distance, the other-vehicle behavior prediction method according to the present embodiment predicts that the probability of the first oncoming vehicle proceeding through the intersection ahead of the host vehicle is higher than the probability of the host vehicle proceeding through the intersection ahead of the first oncoming vehicle. With this, when the space between the host-vehicle passing area and the other-vehicle passing area is less than the predetermined value and the distance between the first oncoming vehicle and the intersection is less than the predetermined value, and driving assistance for the host vehicle can be performed with the determination to yield the right of way to the intersection to the first oncoming vehicle. When the space between the host-vehicle passing area and the other-vehicle passing area is greater than or equal to the predetermined value or the distance between the first oncoming vehicle and the intersection is greater than or equal to the predetermined value, and driving assistance for the host vehicle can be performed with the determination not to yield the right of way to the intersection to the first oncoming vehicle.

The other-vehicle behavior prediction method according to the present embodiment calculates the distance between a first oncoming vehicle and an intersection based on the distance between the first oncoming vehicle and the center of the intersection. Alternatively, the other-vehicle behavior prediction method of the driving assistance device according to the present embodiment may detect the position of a stop line before the intersection, and may calculate the distance between the first oncoming vehicle and the intersection based on the distance between the first oncoming vehicle and the stop line.

The driving assistance method using the other-vehicle behavior prediction method according to the present embodiment controls travel of the host vehicle based on the prediction result of the probability that the first oncoming vehicle will proceed through the intersection ahead of the host vehicle. Thus, when the probability that the first oncoming vehicle will proceed through the intersection ahead of the host vehicle is high, the travel of the host vehicle can be controlled so as to yield the right of way to the intersection to the first oncoming vehicle.

Furthermore, when the priority of a road before the travel path of the host vehicle turning right or left at the intersection is higher than the priority of a road ahead of the travel path of the host vehicle turning right or left, the other-vehicle behavior prediction method according to the present embodiment may predict, based on the space and distance, the probability that the first oncoming vehicle will proceed through the intersection ahead of the host vehicle. When the priority of the host vehicle is higher than the priority of the first oncoming vehicle, by predicting the probability that the first oncoming vehicle will proceed through the intersection ahead of the host vehicle, even when the first oncoming vehicle proceeds through the intersection ahead of the host vehicle despite the higher priority of the host vehicle, it can be determined to yield the right of way to the intersection to the first oncoming vehicle according to the behavior of the first oncoming vehicle. As a result, it is possible to prevent the driver of the host vehicle from feeling uncomfortable due to the host vehicle and the first oncoming vehicle approaching each other when turning right or left at the intersection.

Second Embodiment

The second embodiment to which the present invention is applied will be described below with reference to the drawings. In the description of the drawings, the same parts as in the first embodiment are denoted by the same symbols, and the description thereof will be omitted.

The other-vehicle preceding probability prediction unit 15 of the driving assistance device according to the first embodiment predicted that the first oncoming vehicle 32 had a higher probability of proceeding through the intersection than the host vehicle 31 when two conditions were satisfied: condition 1 that the space 61 between the host-vehicle passing area 42 and the other-vehicle passing area 52 is less than the predetermined value of the space; and condition 2 that the distance 71 between the first oncoming vehicle 32 and the intersection is less than the predetermined value of the distance. Then, the vehicle control unit 21 controlled the travel of the host vehicle 31 based on the prediction result.

In contrast, the other-vehicle preceding probability prediction unit 15 of the driving assistance device according to the second embodiment performs addition to the probability (hereinafter referred to as other-vehicle preceding probability) that the first oncoming vehicle 32 will proceed through the intersection ahead of the host vehicle 31 when the above-described two conditions, condition 1 and condition 2, are satisfied. In addition, the other-vehicle preceding probability prediction unit 15 may further set a condition that affects the other-vehicle preceding probability and is different from conditions 1 and 2. In this case, the other-vehicle preceding probability prediction unit 15 performs addition to the other-vehicle preceding probability when one condition different from conditions 1 and 2 is satisfied. Then, the other-vehicle preceding probability prediction unit 15 determines a control method for the host vehicle 31 according to the value of the other-vehicle preceding probability when the judgment of all conditions is completed. Note that the other-vehicle preceding probability prediction unit 15 may determine a control method for the host vehicle 31 based on a combination of conditions judged to satisfy the conditions, rather than on the value of the other-vehicle preceding probability.

The vehicle control unit 21 then controls the travel of the host vehicle 31 based on the determination result of the other-vehicle preceding probability prediction unit 15. Note that other configurations of the driving assistance device are the same as those of the first embodiment, and the description thereof will thus be omitted.

[Other-Vehicle Behavior Prediction Method]

Figure 6:
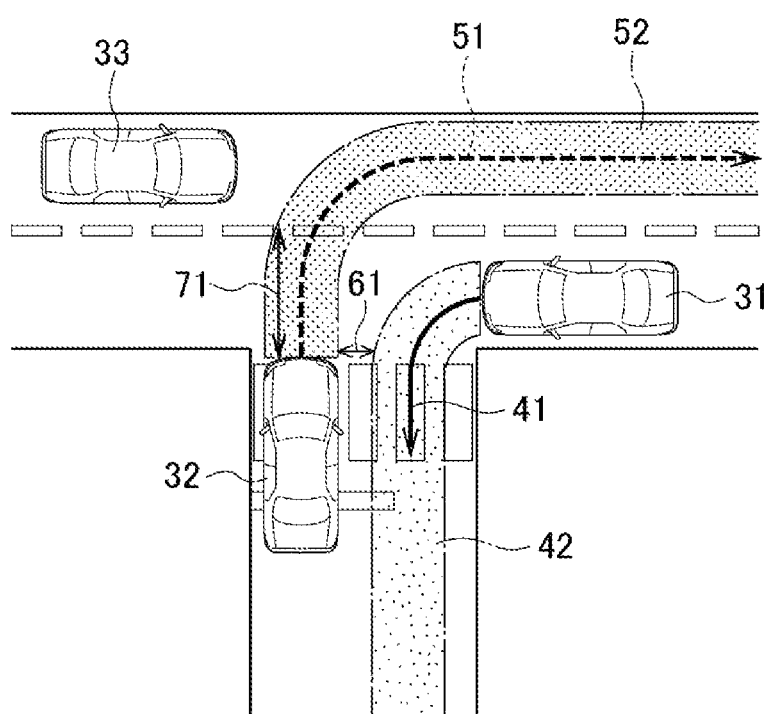
FIG. 6 is a diagram illustrating an example of a scene to which an other-vehicle behavior prediction method according to a second embodiment of the present invention is applied.

An example of the other-vehicle behavior prediction method of the driving assistance device according to the second embodiment will be described below with reference to FIG. 6. In FIG. 6, the host-vehicle travel path 41 of the host vehicle 31 turns left at an intersection, and the first oncoming vehicle 32 is present on the road ahead of the host-vehicle travel path 41 turning left. Then, a second oncoming vehicle 33 approaching the intersection is present and has stopped before the intersection on the road before the host-vehicle travel path 41 turning left at the intersection.

In FIG. 6, the space 61 between the host-vehicle passing area 42 and the other-vehicle passing area 52 is narrow and the first oncoming vehicle 32 is present at a position near the intersection. The other-vehicle preceding probability prediction unit 15 performs addition to the other-vehicle advance probability when conditions 1 and 2 are satisfied, for example. The other-vehicle preceding probability prediction unit 15 adds 60% to the other-vehicle advance probability, for example.

Also, in FIG. 6, the second oncoming vehicle 33 approaching the intersection is present on the road before the host-vehicle travel path 41 turning left at the intersection, and thus the first oncoming vehicle 32 has a possibility to slow down or stop temporarily. In contrast, when there is no second oncoming vehicle 33 approaching the intersection on the road before the host-vehicle travel path 41 turning left at the intersection, it can be predicted that the probability that the first oncoming vehicle 32 will proceed through the intersection ahead of the host vehicle 31 is higher because there is no obstacle for the first oncoming vehicle 32 to proceed through the intersection. Therefore, when the condition that there is no second oncoming vehicle 33 approaching the intersection on the road before the host-vehicle travel path 41 turning left at the intersection (hereinafter referred to as condition 3) is satisfied, the other-vehicle preceding probability prediction unit 15 performs addition to the other-vehicle preceding probability. For example, when the condition 3 is satisfied, the other-vehicle preceding probability prediction unit 15 adds 10% to the other-vehicle preceding probability.

Furthermore, the second oncoming vehicle 33 has stopped before the intersection. Thus, it can be predicted that there is no obstacle for the first oncoming vehicle 32 to proceed through the intersection and that the probability that the first oncoming vehicle 32 will proceed through the intersection ahead of the host vehicle 31 is higher. For this reason, the other-vehicle preceding probability prediction unit 15 performs addition to the other-vehicle preceding probability when the condition that the second oncoming vehicle 33 approaching the intersection is present on the road before the host-vehicle travel path 41 turning left at the intersection and the second oncoming vehicle 33 has stopped before the intersection (hereinafter referred to as condition 4) is satisfied. When the condition 4 is satisfied, the other-vehicle preceding probability prediction unit 15 adds 10% to the other-vehicle preceding probability, for example.

As another condition, when the speed of the first oncoming vehicle 32 is high, it is thought unlikely that the first oncoming vehicle has an intention to stop before the intersection, and it can be predicted that the probability that the first oncoming vehicle will proceed through the intersection ahead of the host vehicle is higher. Thus, when a condition that the speed of the first oncoming vehicle 32 is greater than or equal to a predetermined value of a preset speed (hereinafter referred to as condition 5) is satisfied, the other-vehicle preceding probability prediction unit 15 performs addition to the other-vehicle preceding probability. When condition 5 is satisfied, the other-vehicle preceding probability prediction unit 15 adds 10% to the other-vehicle preceding probability, for example.

The other-vehicle preceding probability prediction unit 15 determines a control method according to the other-vehicle preceding probability at the time when the determination of conditions 1 to 5 is completed. For example, the other-vehicle preceding probability prediction unit 15 determines to start decelerating the host vehicle 31 when the other-vehicle preceding probability is greater than or equal to a first predetermined value and less than a second predetermined value. For example, the other-vehicle preceding probability prediction unit 15 determines to start decelerating the host vehicle 31 when the other-vehicle preceding probability is 60% or more and less than 70%.

When the other-vehicle preceding probability is greater than or equal to the second predetermined value and less than a third predetermined value, it is determined that the host vehicle 31 is to be slowed down. For example, the other-vehicle preceding probability prediction unit 15 determines that the host vehicle 31 is to be slowed down when the other-vehicle preceding probability is 70% or more and less than 80%.

Then, when the other-vehicle preceding probability is greater than or equal to the third predetermined value, it is determined that the host vehicle 31 is to be stopped before the intersection. For example, the other-vehicle preceding probability prediction unit 15 determines to stop the host vehicle 31 before the intersection when the other-vehicle preceding probability is 80% or more. The vehicle control unit 21 controls the travel of the host vehicle 31 based on the determination result of the other-vehicle preceding probability prediction unit 15.

Figure 7:
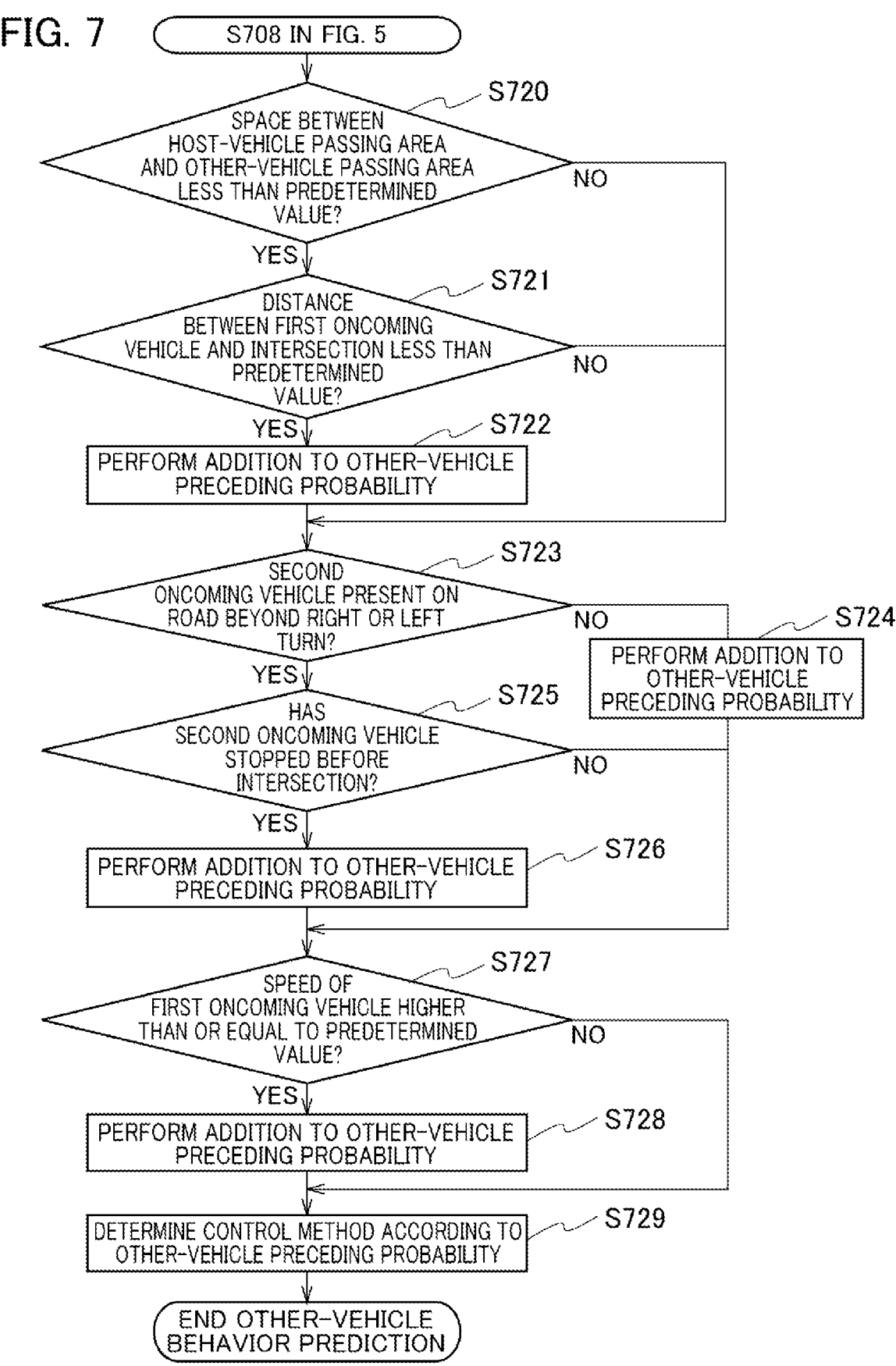
FIG. 7 is a flowchart illustrating an example of the detailed procedure of step S07 in FIG. 4.

Next, an example of the driving assistance processing of the driving assistance device according to the second embodiment will be described with reference to FIG. 7. The driving assistance device according to the present embodiment performs the same processing as steps S01 to S06 in FIG. 4. Then, in step S07 in FIG. 4, after the same processing as steps S701 to S708 in FIG. 5 is performed, processing of steps S720 to S729 in FIG. 7 is performed. Among the driving assistance processing according to the second embodiment, the description of the same processing as in the first embodiment will be omitted.

In step S720 in FIG. 7, the other-vehicle preceding probability prediction unit 15 determines whether the space 61 between the host-vehicle passing area 42 and the other-vehicle passing area 52 is less than a predetermined value of a preset space. When the space 61 between the host-vehicle passing area 42 and the other-vehicle passing area 52 is less than the predetermined value of the preset space (YES in step S720), the processing proceeds to step S721. In contrast, when the space 61 between the host-vehicle passing area 42 and the other-vehicle passing area 52 is greater than or equal to the predetermined value of the preset space (NO in step S720), the processing proceeds to step S723.

In step S721, the other-vehicle preceding probability prediction unit 15 determines whether the distance 71 between the intersection and the first oncoming vehicle 32 is less than a predetermined value of a preset distance. When the distance 71 between the intersection and the first oncoming vehicle 32 is less than the predetermined value of the preset distance (YES in step S721), the processing proceeds to step S722. In contrast, when the distance 71 between the intersection and the first oncoming vehicle 32 is greater than or equal to the predetermined value of the preset distance (NO in step S721), the processing proceeds to step S723.

In step S722, the other-vehicle preceding probability prediction unit 15 performs addition to the other-vehicle preceding probability. The other-vehicle preceding probability prediction unit 15 adds, for example, 60% to the initial value 0% of the other-vehicle preceding probability. Then, the processing proceeds to step S723.

In step S723, the other-vehicle preceding probability prediction unit 15 determines whether or not a second oncoming vehicle 33 approaching the intersection is present on the road before the host-vehicle travel path 41 turning right or left at the intersection. When the second oncoming vehicle 33 approaching the intersection is present on the road before the host-vehicle travel path 41 turning right or left at the intersection (YES in step S723), the processing proceeds to step S725. In contrast, when no second oncoming vehicle 33 approaching the intersection is present on the road before the host-vehicle travel path 41 turning right or left at the intersection (NO in step S723), the processing proceeds to step S724.

In step S724, the other-vehicle preceding probability prediction unit 15 performs addition to the other-vehicle preceding probability. The other-vehicle preceding probability prediction unit 15 adds, for example, 10% to the other-vehicle preceding probability. Then, the processing proceeds to step S727.

In step S725, the other-vehicle preceding probability prediction unit 15 determines whether or not the second oncoming vehicle 33 has stopped before the intersection. When the second oncoming vehicle 33 has stopped before the intersection (YES in step S725), the processing proceeds to step S726. In contrast, when the second oncoming vehicle 33 has not stopped before the intersection (NO in step S725), the processing proceeds to step S727.

In step S726, the other-vehicle preceding probability prediction unit 15 performs addition to the other-vehicle preceding probability. The other-vehicle preceding probability prediction unit 15 adds, for example, 10% to the other-vehicle preceding probability. Then, the processing proceeds to step S727.

In step S727, the other-vehicle preceding probability prediction unit 15 determines whether the speed of the first oncoming vehicle 32 is higher than or equal to a predetermined value of a preset speed. When the speed of the first oncoming vehicle 32 is higher than or equal to the predetermined value of the preset speed (YES in step S727), the processing proceeds to step S728. In contrast, when the speed of the first oncoming vehicle 32 is lower than the predetermined value of the preset speed (NO in step S727), the processing proceeds to step S729.

In step S728, the other-vehicle preceding probability prediction unit 15 performs addition to the other-vehicle preceding probability. The other-vehicle preceding probability prediction unit 15 adds, for example, 10% to the other-vehicle preceding probability. Then, the processing proceeds to step S729.

In step S729, the other-vehicle preceding probability prediction unit 15 determines a control method for the host vehicle 31 according to the value of the other-vehicle preceding probability. For example, the other-vehicle preceding probability prediction unit 15 determines to start decelerating the host vehicle 31 when the other-vehicle preceding probability is 60% or more and less than 70%. When the other-vehicle preceding probability is 70% or more and less than 80%, it is determined that the host vehicle 31 is to be slowed down. When the other-vehicle preceding probability is 80% or more, it is determined that the host vehicle 31 is to be stopped before the intersection. Then, the processing in FIG. 7 ends, and step S07 in FIG. 4 ends.

The processing proceeds to step S08 in FIG. 4 where the vehicle control unit 21 controls the travel of the host vehicle 31 based on the determination result of the other-vehicle preceding probability prediction unit 15.

Effect of the Second Embodiment

As described above, according to the present embodiment, the following effects can be obtained.

When there is no second oncoming vehicle approaching the intersection on the road before the travel path of the host vehicle turning right or left at the intersection, the other-vehicle behavior prediction method according to the present embodiment performs addition to the probability that the first oncoming vehicle will proceed through the intersection ahead of the host vehicle. When there is no second oncoming vehicle on the road before the travel path of the host vehicle turning right or left at the intersection, the probability that the first oncoming vehicle will proceed through the intersection ahead of the host vehicle can be predicted to be higher because there is no obstacle for the first oncoming vehicle to proceed through the intersection. It is thus possible to predict more accurately the probability that the first oncoming vehicle will proceed through the intersection ahead of the host vehicle.

In addition, when there is a second oncoming vehicle approaching the intersection on the road before the travel path of the host vehicle turning right or left at the intersection and the second oncoming vehicle has stopped before the intersection, the other-vehicle behavior prediction method according to the present embodiment performs addition to the probability that the first oncoming vehicle will proceed through the intersection ahead of the host vehicle. When there is a second oncoming vehicle on the road before the travel path of the host vehicle turning right or left at the intersection and the second oncoming vehicle has stopped before the intersection, there is no obstacle for the other vehicle to proceed through the intersection and thus the probability that the first oncoming vehicle will proceed through the intersection ahead of the host vehicle can be predicted to be higher. It is thus possible to predict more accurately the probability that the first oncoming vehicle will proceed through the intersection ahead of the host vehicle.

When the speed of the first oncoming vehicle is greater than or equal to the predetermined value of the preset speed, the other-vehicle behavior prediction method according to the present embodiment performs addition to the probability that the first oncoming vehicle will proceed through the intersection ahead of the host vehicle. When the speed of the first oncoming vehicle is high, it is thought unlikely that the first oncoming vehicle has an intention to stop before the intersection, and the probability that the first oncoming vehicle will proceed through the intersection ahead of the host vehicle can be predicted to be higher. It is thus possible to predict more accurately the probability that the first oncoming vehicle will proceed through the intersection ahead of the host vehicle.

The driving assistance method using the other-vehicle behavior prediction method according to the present embodiment starts decelerating of the host vehicle when the probability that the first oncoming vehicle will proceed through the intersection ahead of the host vehicle is greater than or equal to the first predetermined value and less than the second predetermined value. When the probability that the first oncoming vehicle will proceed through the intersection ahead of the host vehicle is greater than or equal to the first predetermined value and less than the second predetermined value, it is possible to start decelerating the host vehicle and to prevent the first oncoming vehicle and the host vehicle approaching each other when proceeding through the intersection. It is possible to reduce risk when the first oncoming vehicle comes near the host vehicle.

The driving assistance method using the other-vehicle behavior prediction method according to the present embodiment slows down the host vehicle when the probability that the first oncoming vehicle will proceed through the intersection ahead of the host vehicle is greater than or equal to the second predetermined value and less than the third predetermined value. When the probability that the first oncoming vehicle will proceed through the intersection ahead of the host vehicle is greater than or equal to the second predetermined value and less than the third predetermined value, it is possible to slow down the host vehicle and to prevent the first oncoming vehicle and the host vehicle approaching each other when proceeding through the intersection. It is possible to reduce risk when the first oncoming vehicle comes near the host vehicle.

The driving assistance method using the other-vehicle behavior prediction method according to the present embodiment stops the host vehicle before the intersection when the probability that the first oncoming vehicle will proceed through the intersection ahead of the host vehicle is greater than or equal to the third predetermined value. When the probability that the first oncoming vehicle will proceed through the intersection ahead of the host vehicle is greater than or equal to the third predetermined value, it is possible to stop the host vehicle before the intersection and to prevent the first oncoming vehicle and the host vehicle approaching each other when proceeding through the intersection.

REFERENCE SIGNS LIST

31 Host vehicle
41 Host-vehicle travel path (travel path of host vehicle)
100 Microcomputer (driving assistance device)
32 First oncoming vehicle
42 Host-vehicle passing area
52 Other-vehicle passing area
61 Space
71 Distance

The invention claimed is:

1. A driving assistance method for predicting behavior of a vehicle different from a host vehicle, the method comprising:
   calculating a travel path of the host vehicle;
   detecting a position of an intersection present on the travel path of the host vehicle and within a predetermined distance from the host vehicle;
   detecting a position of a first oncoming vehicle relative to the host vehicle before the intersection;
   when the first oncoming vehicle is on a road ahead of the travel path of the host vehicle and is turning right or left at the intersection, calculating a host-vehicle passing area through which the host vehicle passes when proceeding through the intersection and an other-vehicle passing area through which the first oncoming vehicle is predicted to pass when proceeding through the intersection;
   calculating a space between the host-vehicle passing area and the other-vehicle passing area;
   calculating a distance between the first oncoming vehicle and the intersection;
   predicting, based on the space and the distance, a probability that the first oncoming vehicle will proceed through the intersection ahead of the host vehicle; and
   controlling travel of the host vehicle based on a prediction result of the probability that the first oncoming vehicle will proceed through the intersection ahead of the host vehicle.

2. The driving assistance method according to claim 1, further comprising:
   when the space is less than a predetermined value of a preset space and the distance is less than a predetermined value of a preset distance, predicting the probability that the first oncoming vehicle will proceed through the intersection ahead of the host vehicle to be higher than a probability that the host vehicle will proceed through the intersection ahead of the first oncoming vehicle.

3. The driving assistance method according to claim 1, further comprising:
   when there is no second oncoming vehicle approaching the intersection on a road before the travel path of the host vehicle turning right or left at the intersection, performing addition to the probability that the first oncoming vehicle will proceed through the intersection ahead of the host vehicle.

4. The driving assistance method according to claim 1, further comprising:
   when there is a second oncoming vehicle approaching the intersection on a road before the travel path of the host vehicle turning right or left at the intersection and the second oncoming vehicle has stopped before the intersection, performing addition to the probability that the first oncoming vehicle will proceed through the intersection ahead of the host vehicle.

5. The driving assistance method according to claim 1, further comprising:
when a speed of the first oncoming vehicle is greater than or equal to a predetermined value of a preset speed, performing addition to the probability that the first oncoming vehicle will proceed through the intersection ahead of the host vehicle.

6. The driving assistance method according to claim 1, further comprising:
calculating the distance between the first oncoming vehicle and the intersection, based on a distance between the first oncoming vehicle and a center of the intersection.

7. The driving assistance method according to claim 1, further comprising:
detecting a position of a stop line before the intersection; and
calculating the distance between the first oncoming vehicle and the intersection, based on a distance between the first oncoming vehicle and the stop line.

8. The driving assistance method according to claim 1, further comprising:
when a priority of a road before the travel path of the host vehicle turning right or left at the intersection is higher than a priority of a road ahead of the travel path of the host vehicle turning right or left, predicting the probability that the first oncoming vehicle will proceed through the intersection ahead of the host vehicle, based on the space and the distance.

9. The driving assistance method according to claim 1, further comprising:
when the probability that the first oncoming vehicle will proceed through the intersection ahead of the host vehicle is greater than or equal to a first predetermined value and less than a second predetermined value, starting deceleration of the host vehicle.

10. The driving assistance method according to claim 1, further comprising:
when the probability that the first oncoming vehicle will proceed through the intersection ahead of the host vehicle is greater than or equal to a second predetermined value and less than a third predetermined value, slowing down the host vehicle.

11. The driving assistance method according to claim 1, further comprising:
when the probability that the first oncoming vehicle will proceed through the intersection ahead of the host vehicle is greater than or equal to a third predetermined value, stopping the host vehicle before the intersection.

12. A driving assistance device comprising a control unit configured to:
calculate a travel path of a host vehicle;
detect a position of an intersection present on the travel path of the host vehicle and within a predetermined distance from the host vehicle;
detect a position of a first oncoming vehicle relative to the host vehicle before the intersection;
when the first oncoming vehicle is on a road ahead of the travel path of the host vehicle and turning right or left at the intersection, calculate a host-vehicle passing area through which the host vehicle passes when proceeding through the intersection and an other-vehicle passing area through which the first oncoming vehicle is predicted to pass when proceeding through the intersection;
calculate a space between the host-vehicle passing area and the other-vehicle passing area;
calculate a distance between the first oncoming vehicle and the intersection;
based on the space and the distance, predict a probability that the first oncoming vehicle will proceed through the intersection ahead of the host vehicle; and
control travel of the host vehicle based on a prediction result of the probability that the first oncoming vehicle will proceed through the intersection ahead of the host vehicle.

* * * * *